(12) United States Patent
Fukuhara et al.

(10) Patent No.: US 11,434,310 B2
(45) Date of Patent: Sep. 6, 2022

(54) DISPERSION STABILIZER FOR SUSPENSION POLYMERIZATION AND METHOD FOR PRODUCING VINYL POLYMER USING SAME

(71) Applicant: KURARAY CO., LTD., Kurashiki (JP)

(72) Inventors: Tadahito Fukuhara, Ibaraki (JP); Yusuke Amano, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 108 days.

(21) Appl. No.: 16/636,481

(22) PCT Filed: Aug. 6, 2018

(86) PCT No.: PCT/JP2018/029472
§ 371 (c)(1),
(2) Date: Feb. 4, 2020

(87) PCT Pub. No.: WO2019/031461
PCT Pub. Date: Feb. 14, 2019

(65) Prior Publication Data
US 2020/0247915 A1    Aug. 6, 2020

(30) Foreign Application Priority Data

Aug. 8, 2017  (JP) .............................. JP2017-153408
Mar. 20, 2018  (JP) .............................. JP2018-052924

(51) Int. Cl.
| | |
|---|---|
| *C08F 214/06* | (2006.01) |
| *C08F 8/12* | (2006.01) |
| *C08F 2/44* | (2006.01) |
| *C08F 2/38* | (2006.01) |
| *C08F 2/18* | (2006.01) |
| *C08F 2/20* | (2006.01) |
| *C08L 29/04* | (2006.01) |

(52) U.S. Cl.
CPC .................. *C08F 2/20* (2013.01); *C08F 2/18* (2013.01); *C08F 2/38* (2013.01); *C08F 2/44* (2013.01); *C08F 8/12* (2013.01); *C08F 214/06* (2013.01); *C08L 29/04* (2013.01)

(58) Field of Classification Search
CPC ...... C08F 2/20; C08F 2/18; C08F 2/38; C08F 2/44; C08F 8/12; C08F 214/06; C08L 29/04
USPC ........................................................ 524/459
See application file for complete search history.

(56) References Cited

U.S. PATENT DOCUMENTS

| | | | |
|---|---|---|---|
| 10,301,402 B2 * | 5/2019 | Kozuka | .................. C08F 14/06 |
| 2004/0186232 A1 | 9/2004 | Shibutani | |
| 2009/0111940 A1 | 4/2009 | Kato et al. | |
| 2016/0083490 A1 | 3/2016 | Kumaki et al. | |
| 2017/0198068 A1 | 7/2017 | Kozuka et al. | |
| 2017/0335030 A1 | 11/2017 | Fukuhara | |

FOREIGN PATENT DOCUMENTS

| | | | |
|---|---|---|---|
| EP | 3 150 639 A1 | 4/2017 | |
| JP | 51-45189 A | 4/1976 | |
| JP | 61-108602 A | 5/1986 | |
| JP | 2004-250695 A | 9/2004 | |
| JP | 2 154 161 A1 | 2/2010 | |
| JP | 2016-79308 A | 5/2016 | |
| WO | WO 2007/119735 A1 | 10/2007 | |
| WO | WO 2014/171502 A1 | 10/2014 | |
| WO | WO 2015/182567 A1 | 12/2015 | |
| WO | WO-2015182567 A1 * | 12/2015 | ............. C08F 14/06 |
| WO | WO 2016/076349 A1 | 5/2016 | |

OTHER PUBLICATIONS

International Search Report dated Nov. 6, 2018 in PCT/JP2018/029472 filed Aug. 6, 2018, 2 pages.
Extended European Search Report dated Mar. 19, 2021 in European Patent Application No. 18843699.2, 7 pages.

\* cited by examiner

*Primary Examiner* — Kelechi C Egwim
(74) *Attorney, Agent, or Firm* — Oblon, McClelland, Maier & Neustadt, L.L.P.

(57) ABSTRACT

The present invention provides a dispersion stabilizer for suspension polymerization that, when used for suspension polymerization of a vinyl compound, provides excellent polymerization stability, and can produce a vinyl polymer having a reduced number of coarse particles, and a reduced number of fisheyes when molded into a sheet form. The present invention also provides a method therewith. The present invention relates to a dispersion stabilizer for suspension polymerization of a vinyl compound, the dispersion stabilizer comprising a vinyl alcohol polymer (A) having a viscosity-average degree of polymerization of more than 400 and less than 1,000, a degree of saponification of more than 67 mol % and less than 78 mol %, 0.02 mol % to 1.0 mol % of a group having an ethylenic double bond in its side chain, and an absorbance (x) at 280 nm of more than 0.17 and less than 0.65 in an ultraviolet absorption spectrum of a 0.1 mass % aqueous solution.

10 Claims, No Drawings

DISPERSION STABILIZER FOR SUSPENSION POLYMERIZATION AND METHOD FOR PRODUCING VINYL POLYMER USING SAME

TECHNICAL FIELD

The present invention relates to a dispersion stabilizer for suspension polymerization comprising a vinyl alcohol polymer having a degree of saponification and a viscosity-average degree of polymerization within specific ranges, a specific proportion of a group having an ethylenic double bond in its side chain, and a specific absorbance. The present invention also relates to a method for producing a vinyl polymer by using such a dispersion stabilizer.

BACKGROUND ART

An example of a use of polyvinyl alcohol (hereinafter, also referred to as "PVA" for short) is a dispersion stabilizer for suspension polymerization of a vinyl compound, and a variety of PVAs are used to this end.

For example, for the purpose of inhibiting coarsening of a product vinyl polymer by improving polymerization stability in polymerization of a vinyl compound, Patent Literature 1 and Patent Literature 2 use a heat-treated PVA as a dispersion stabilizer for suspension polymerization of a vinyl compound. In Patent Literature 3, a PVA obtained through copolymerization of a multifunctional monomer having two or more ethylenic double bonds is used as a dispersion stabilizer for suspension polymerization of a vinyl compound.

However, while the methods described in the foregoing patent documents can achieve improvement of polymerization stability in polymerization of a vinyl compound, these techniques are not satisfactory against the current requirements. The foregoing patent documents also involve a number of issues, including large numbers of fisheyes resulting from seeding or defects upon molding of the vinyl polymer into a sheet form, and high levels of insolubles in an aqueous solution due to the presence of the reactive double bond.

CITATION LIST

Patent Literature

Patent Literature 1: JP S51-45189 A
Patent Literature 2: JP 2004-250695 A
Patent Literature 3: WO2014/171502

SUMMARY OF INVENTION

Technical Problem

An object of the present invention is to provide a dispersion stabilizer for suspension polymerization comprising a vinyl alcohol polymer that, when used as a dispersion stabilizer for suspension polymerization of a vinyl compound, provides excellent polymerization stability, and can produce a vinyl polymer having a reduced number of coarse particles, and a reduced number of fisheyes when molded into a sheet form. Another object of the present invention is to provide a method for producing a vinyl polymer therewith. Yet another object of the present invention is to provide a dispersion stabilizer for suspension polymerization that can be used to produce a vinyl polymer having excellent plasticizer absorptivity, and a method for producing a vinyl polymer therewith.

Solution to Problem

The present inventors conducted intensive studies to find a solution to the foregoing problems, and found that a dispersion stabilizer for suspension polymerization of a vinyl compound can solve the foregoing problems when it comprises a vinyl alcohol polymer having a degree of saponification and a viscosity-average degree of polymerization within specific ranges, a specific proportion of a group having an ethylenic double bond in its side chain, and a specific range of absorbance. The present invention was completed on the basis of this finding.

Specifically, the present invention includes the following.

[1] A dispersion stabilizer for suspension polymerization of a vinyl compound, the dispersion stabilizer comprising a vinyl alcohol polymer (A) having a viscosity-average degree of polymerization of more than 400 and less than 1,000, a degree of saponification of more than 67 mol % and less than 78 mol %, 0.02 mol % to 1.0 mol % of a group having an ethylenic double bond in its side chain, and an absorbance (x) at 280 nm of more than 0.17 and less than 0.65 in an ultraviolet absorption spectrum of a 0.1 mass % aqueous solution.

[2] The dispersion stabilizer for suspension polymerization according to [1], wherein the vinyl alcohol polymer (A) comprises a terminal with an aliphatic acyl group having 2 to 8 carbon atoms, or with a propyl group.

[3] The dispersion stabilizer for suspension polymerization according to [2], wherein the aliphatic acyl group has 2 to 4 carbon atoms.

[4] The dispersion stabilizer for suspension polymerization according to [2] or [3], wherein the aliphatic acyl group is an acetyl group.

[5] The dispersion stabilizer for suspension polymerization according to any one of [1] to [4], wherein the group having an ethylenic double bond is an allyl ether group or a vinyl ether group.

[6] The dispersion stabilizer for suspension polymerization according to [1], wherein the vinyl alcohol polymer (A) comprises a terminal with 0.0005 mol % to 0.1 mol % of a propyl group.

[7] The dispersion stabilizer for suspension polymerization according to [1] or [6], wherein the group having an ethylenic double bond is at least one selected from the group consisting of an itaconyl group, a methacryloyl group, and an acryloyl group.

[8] A method for producing a vinyl polymer, comprising subjecting a vinyl compound to suspension polymerization in the presence of the dispersion stabilizer for suspension polymerization of any one of [1] to [7].

[9] The method for producing a vinyl polymer according to [8], wherein the vinyl compound is subjected to suspension polymerization in the presence of an additional vinyl alcohol polymer (B) having a viscosity-average degree of polymerization of less than 600, and a degree of saponification of more than 30 mol % and less than 60 mol %.

Advantageous Effects of Invention

When used as a dispersion stabilizer for suspension polymerization of a vinyl compound, a dispersion stabilizer for suspension polymerization comprising a vinyl alcohol polymer according to the present invention provides excellent polymerization stability, and can produce a vinyl polymer having a reduced number of coarse particles, and a reduced number of fisheyes when molded into a sheet form. The present invention also can provide a dispersion stabilizer for suspension polymerization that can be used to produce a vinyl polymer having excellent plasticizer absorptivity, and a method for producing a vinyl polymer therewith. As used herein, "polymerization stability" means a property that enables production of vinyl polymer particles of a uniform diameter with reduced coarsening by providing desirable dispersibility for liquid droplets of a vinyl compound during its polymerization.

DESCRIPTION OF EMBODIMENTS

Dispersion Stabilizer for Suspension Polymerization

A dispersion stabilizer for suspension polymerization of the present invention comprises a vinyl alcohol polymer (A) (hereinafter, also referred to as "PVA(A)" for short) having a viscosity-average degree of polymerization of more than 400 and less than 1,000, a degree of saponification of more than 67 mol % and less than 78 mol %, 0.02 mol % to 1.0 mol % of a group having an ethylenic double bond in its side chain, and an absorbance (x) at 280 nm of more than 0.17 and less than 0.65 in an ultraviolet absorption spectrum of a 0.1 mass % aqueous solution. The dispersion stabilizer for suspension polymerization of the present invention, when used as a dispersion stabilizer for suspension polymerization of a vinyl compound, stabilizes the polymerization reaction, and reduces formation of coarse particles. The dispersion stabilizer for suspension polymerization of the present invention also improves workability because it enables production of a vinyl polymer having excellent plasticizer absorptivity, and a reduced number of fisheyes when formed into a sheet form. A dispersion stabilizer for suspension polymerization of the present invention may consisting essentially of the vinyl alcohol polymer (A). As used herein, "consisting essentially of vinyl alcohol polymer (A)" means that the content of components other than the vinyl alcohol polymer (A) contained in the dispersion stabilizer for suspension polymerization is less than 5.0 mass %, preferably less than 1.0 mass %, more preferably less than 0.1 mass %, even more preferably less than 0.01 mass %. In this specification, the upper limits and lower limits of numeric ranges (ranges of, for example, contents of components, values calculated from components, and values of physical properties) may be combined appropriately.

Vinyl Alcohol Polymer (A)

A feature of the vinyl alcohol polymer (A) of the present invention is that it has a viscosity-average degree of polymerization of more than 400 and less than 1,000, a degree of saponification of more than 67 mol % and less than 78 mol %, 0.02 mol % to 1.0 mol % of a group having an ethylenic double bond in its side chain, and an absorbance (x) at 280 nm of more than 0.17 and less than 0.65 in an ultraviolet absorption spectrum of a 0.1 mass % aqueous solution.

It is important that the viscosity-average degree of polymerization of PVA(A) be more than 400 and less than 1,000. Preferably, the viscosity-average degree of polymerization of PVA(A) is more than 600 and less than 900. A viscosity-average degree of polymerization of 400 or less decreases the polymerization stability, and increases the coarse particles in the resulting vinyl polymer when the dispersion stabilizer is used for suspension polymerization of a vinyl compound. A viscosity-average degree of polymerization of 1,000 or more increases the water-insoluble content of PVA(A), decreases the plasticizer absorptivity of the vinyl polymer produced, or increases the fisheyes when the vinyl polymer produced is molded into a sheet form.

The viscosity-average degree of polymerization is a measured value according to JIS K 6726:1994. Specifically, in the case of a PVA having a degree of saponification of less than 99.5 mol %, the PVA is saponified until the degree of saponification reaches at least 99.5 mol %, and the viscosity-average degree of polymerization (P) is determined from the limiting viscosity [η] (L/g) measured in water at 30° C., using the following formula.

$$P=([\eta]\times10^4/8.29)^{(1/0.62)}$$

It is important that the degree of saponification of PVA(A) be more than 67 mol % and less than 78 mol %. Preferably, the degree of saponification of PVA(A) is more than 70 mol % and less than 75 mol %. A degree of saponification of 67 mol % or less lowers the water solubility of PVA(A), or decreases the polymerization stability when the dispersion stabilizer is used for suspension polymerization of a vinyl compound, increasing the coarse particles in the vinyl polymer produced. A degree of saponification of 78 mol % or more decreases the polymerization stability when the dispersion stabilizer is used for suspension polymerization of a vinyl compound, with the result that the vinyl polymer produced has an increased number of coarse particles, a reduced plasticizer absorptivity, and an increased number of fisheyes when molded into a sheet form. The degree of saponification is a measured value according to JIS K 6726:1994.

It is important that the PVA(A) comprise 0.02 mol % to 1.0 mol % of a group having an ethylenic double bond its side chain (hereinafter, also referred to as "modifying group the side chain"), relative to all monomer units. The content of the group is preferably 0.05 mol % to 0.90 mol %, more preferably 0.05 mol % to 0.70 mol %, even more preferably 0.07 mol % to 0.55 mol %, particularly preferably 0.08 mol % to 0.50 mol %. With a content of less than 0.02 mol %, the dispersion stabilizer is not able to provide sufficient polymerization stability when used as a dispersion stabilizer for suspension polymerization of a vinyl compound, and the number of coarse particles increases in the vinyl polymer produced. With a content of more than 1.0 mol %, the water-insoluble content of PVA(A) increase, or the dispersion stabilizer is not able to provide sufficient polymerization stability when used as a dispersion stabilizer for suspension polymerization of a vinyl compound, or the fisheyes increase when the vinyl polymer produced is molded into a sheet form.

The group having an ethylenic double bond may have one or more ethylenic double bonds. However, the group has preferably one ethylenic double bond so that gelation in the PVA(A) polymerization step or in the vinyl compound suspension polymerization step can be reduced. Examples of the group having an ethylenic double bond include an allyl ether group, a vinyl ether group, an itaconyl group, a methacryloyl group, and an acryloyl group. In a preferred embodiment, an allyl ether group or a vinyl ether group is used, and, preferably, an allyl ether group is used from the viewpoint of the preservation stability of the PVA(A) obtained. In another preferred embodiment, the PVA(A) has at least one group in its side chain selected from the group consisting of an itaconyl group, a methacryloyl group, and an acryloyl group. The PVA(A) of the present invention has a reduced level of water-insoluble content in the form of an aqueous solution, despite having a side chain with an ethylenic double bond derived from at least one group selected from the group consisting of an itaconyl group, a methacryloyl group, and an acryloyl group. Accordingly, when the dispersion stabilizer is used for suspension polymerization of a vinyl compound, it is possible to stabilize the polymerization reaction and reduce the formation of coarse particles, reducing the fisheyes when the vinyl polymer produced is molded into a sheet form. Preferably, the PVA (A) contains an itaconyl group or a methacryloyl group from the perspective of availability, the water-insoluble content of PVA(A), and the performance of PVA(A) when the dispersion stabilizer is used for suspension polymerization of a vinyl compound. The PVA(A) comprising a side chain with an ethylenic double bond has high adsorbability for a vinyl compound. Accordingly, when the dispersion stabilizer is used for suspension polymerization of a vinyl compound, the PVA(A) is able to provide excellent polymerization stability, and reduce the formation of coarse particles in the vinyl polymer produced, and the formation of fisheyes when the vinyl polymer produced is molded into a sheet form. The PVA(A) may have other modifying group(s) in its side chain, provided that the effects of the present invention are obtained. The content of such other modifying group(s) is preferably less than 5 mol %, more preferably less than 1 mol %, even more preferably less than 0.1 mol % relative to all monomer units.

Examples of other modifying groups include:

α-olefins such as ethylene, propylene, 1-butene, isobutene, and 1-hexene;

acrylamide derivatives such as acrylamide, N-methylacrylamide, and N-ethylacrylamide;

methacrylamide derivatives such as methacrylamide, N-methylmethacrylamide, and N-ethylmethacrylamide;

monomers having an oxyalkylene group;

hydroxyl group-containing α-olefins such as 3-buten-1-ol, 4-penten-1-ol, 5-hexen-1-ol, 7-octen-1-ol, 9-decen-1-ol, and 3-methyl-3-buten-1-ol;

monomers having a silyl group, such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamide-propyltrimethoxysilane, and 3-(meth)acrylamide-propyltriethoxysilane; and N-vinylamide monomers such as N-vinylformamide, N-vinylacetamide, N-vinyl-2-pyrrolidone, and N-vinyl-2-caprolactam.

It is important that the PVA(A) have an absorbance (x) at 280 nm of more than 0.17 and less than 0.65 in an ultraviolet absorption spectrum of a 0.1 mass % aqueous solution. The absorbance (x) is preferably more than 0.21 and less than 0.60, more preferably more than 0.25 and less than 0.55, even more preferably more than 0.27 and less than 0.54, particularly preferably more than 0.28 and less than 0.46. The ultraviolet absorption spectral absorbance indicates the amount or linkage of the ethylenic double bond present in the main chain of PVA(A), and, with the absorbance confined within the foregoing ranges, the adsorbability for a vinyl compound improves, and, by producing synergy with the ethylenic double bond in a side chain, the PVA(A) is able to further improve the polymerization stability when the dispersion stabilizer is used for suspension polymerization of a vinyl compound. The absorption at 280 nm wavelength derives from the structure $[-(CH=CH)_2-]$ in PVA(A). This structure can be incorporated, for example, by using an aldehyde as a polymerization regulator, or by using a monomer capable of introducing an ethylenic double bond to the main chain through copolymerization. When the absorbance (x) is outside of the foregoing ranges, the adsorbability for a vinyl compound decreases, or the PVA(A) assumes a dissolved state beyond adsorption, with the result that PVA (A) fails to exhibit its effect as a dispersion stabilizer for suspension polymerization. The device used for the measurement of absorbance (x), and other measurement conditions are as described in the Examples below.

Preferably, PVA(A) has a terminal with an aliphatic acyl group having 2 to 8 carbon atoms, or with a propyl group.

In a preferred embodiment, PVA(A) has a terminal with an aliphatic acyl group having 2 to 8 carbon atoms (a group represented by $R^1-CO-$, wherein $R^1$ represents an alkyl group having 1 to 7 carbon atoms). The following describes such an embodiment.

In this specification, the number of carbon atoms in the aliphatic acyl group means the total number of carbon atoms present in the aliphatic acyl group (i.e., the number of carbon atoms in the alkyl group represented by $R^1$ plus the number of carbon atoms in the carbonyl group). The aliphatic acyl group is preferably a saturated aliphatic acyl group. The aliphatic acyl group has preferably 2 to 4 carbon atoms. The alkyl group represented by $R^1$ may be linear or branched. Examples of the alkyl group include a methyl group, an ethyl group, an n-propyl group, an isopropyl group, an n-butyl group, an isobutyl group, a sec-butyl group, a 2-methylpropyl group, a tert-butyl group, an n-pentyl group, an isopentyl group, a sec-pentyl group, a neopentyl group, a 1-ethylpropyl group, a 1,1-dimethylpropyl group, a 1,2-dimethylpropyl group, an n-hexyl group, a 1-methylpentyl group, a 2-methylpentyl group, a 3-methylpentyl group, a 4-methylpentyl group (isohexyl group), a 1-ethylbutyl group, a 2-ethylbutyl group, a 1,1-dimethylbutyl group, a 1,2-dimethylbutyl group, a 1,3-dimethylbutyl group, a 1,4-dimethylbutyl group, a 2,2-dimethylbutyl group, a 2,3-dimethylbutyl group, a 3,3-dimethylbutyl group, a 1-ethyl-2-methyl-propyl group, a 1,1,2-trimethylpropyl group, and an n-heptyl group. The aliphatic acyl group may be linear or branched. Examples of the aliphatic acyl group include an acetyl group, a propionyl group, a butyryl group, an isobutyryl group, a valeryl group, an isovaleryl group, a pivaloyl group, a hexanoyl group, and a heptanoyl group. For performance and handling of when the dispersion stabilizer is used for suspension polymerization, the aliphatic acyl group is preferably an acetyl group. A PVA(A) having a terminal with an aldehyde group (HCO—) is difficult to handle, and the polymerization stability decreases when the dispersion stabilizer is used for suspension polymerization. When the aliphatic acyl group has 9 or more carbon atoms, the water solubility of PVA(A) decreases, and, as a result, the PVA(A) becomes difficult to handle, and the polymerization stability decreases when the dispersion stabilizer is used for suspension polymerization.

In another preferred embodiment, the PVA(A) has a terminal with a propyl group. The content of the propyl group is preferably 0.0005 mol % to 0.1 mol % relative to all monomer units. The propyl group may be introduced by using any method, including, for example, a method that introduces a propyl group to a terminal with the use of a modifying agent for introducing a propyl group. Examples of such a modifying agent for introducing a propyl group include a chain transfer agent such as propanethiol or propyl aldehyde; and a polymerization initiator such as n-propyl peroxydicarbonate. The water-insoluble content of PVA(A) tend to increase when the group introduced to a terminal is an alkyl group longer than a propyl group. When the group introduced to a terminal is an alkyl group shorter than propyl, the performance tends to decrease when the dispersion stabilizer is used for suspension polymerization of a vinyl compound. With 0.0005 mol % to 0.1 mol % of a propyl group introduced to a terminal, the water-insoluble content of a PVA(A) aqueous solution can be reduced, and the PVA(A) is able to further improve the polymerization stability, and more effectively reduce formation of coarse particles by producing synergy with other component(s) when the dispersion stabilizer is used for suspension polymerization of a vinyl compound.

PVA(A) Producing Method

Preferred methods of production of the PVA(A) of the present invention include:

(i) a method that includes a polymerization step of polymerizing a vinyl ester monomer to obtain a vinyl ester polymer, a saponification step of saponifying the vinyl ester polymer to obtain a vinyl alcohol polymer (X), and a step of obtaining a PVA(A) by reacting the vinyl alcohol polymer (X) with an esterification agent for introducing a modifying group to a side chain; and (ii) a method that includes a polymerization step of obtaining a vinyl ester copolymer through copolymerization of a vinyl ester monomer and a monomer having two or more ethylenic double bonds in the presence of a solvent, and a further optional terminal modifying agent, and a saponification step of obtaining a vinyl alcohol polymer through saponification of the vinyl ester polymer obtained in the polymerization step, wherein, in the polymerization step, the vinyl ester monomer and the solvent have a mass ratio (vinyl ester monomer/solvent) of 100/0 to 80/20.

A more preferred method uses a propyl group-introducing modifying agent, a solvent, and an aldehyde (a polymerization regulator) in the polymerization step of method (i).

A more preferred method uses an aldehyde having 2 to 8 carbon atoms as a terminal modifying agent in method (ii).

Methods (i) and (ii) may use a known polymerization method, for example, such as bulk polymerization, solution polymerization, suspension polymerization, emulsion polymerization, or dispersion polymerization. Preferred from an industrial standpoint are solution polymerization, emulsion polymerization, and dispersion polymerization. The polymerization may follow the batch, semi-batch, or continuous procedure.

Examples of the vinyl ester monomer in methods (i) and (ii) include vinyl acetate, vinyl formate, vinyl propionate, vinyl caprylate, and vinyl versatate. preferred from an industrial standpoint is vinyl acetate.

The monomer having two or more ethylenic double bonds used in method (ii) may be selected from various monomers, provided that the monomer contains at least two ethylenic double bonds within the molecule. However, the monomer needs to ensure that the necessary amount of ethylenic double bonds be incorporated without producing a gel as might occur when an excessive crosslinking reaction takes place during the copolymerization with the vinyl ester monomer. A monomer having an appropriate level of reactivity must be selected, taking into account various factors such as the proportion of the monomer having two or more ethylenic double bonds relative to the vinyl ester monomer, polymerization temperature, monomer concentration, polymerization conversion rate, and viscosity-average degree of polymerization. In order to inhibit an excessive crosslinking reaction, the monomer contains preferably two ethylenic double bonds.

Preferred examples of the monomer having two or more ethylenic double bonds include monomers having a vinyl ether group, for example, divinyl ether compounds such as ethanediol divinyl ether, propanediol divinyl ether, butanediol divinyl ether, ethylene glycol divinyl ether, diethylene glycol divinyl ether, triethylene glycol divinyl ether, polyethylene glycol divinyl ether, propylene glycol divinyl ether, and polypropylene glycol divinyl ether.

Preferably, the monomer having two or more ethylenic double bonds is a monomer having an allyl group. Examples of the monomer having an allyl group include:

diene compounds such as pentadiene, hexadiene, heptadiene, octadiene, nonadiene, and decadiene;

allyl ether group-containing monomers, for example, diallyl ether compounds (such as glycerin diallyl ether, diethylene glycol diallyl ether, ethylene glycol diallyl ether, triethylene glycol diallyl ether, polyethylene glycol diallyl ether, trimethylolpropane diallyl ether, and pentaerythritol diallyl ether), triallyl ether compounds (such as glycerin triallyl ether, trimethylolpropane triallyl ether, and pentaerythritol triallyl ether), and tetraallyl ether compounds (such as pentaerythritol tetraallyl ether);

allyl ester group-containing monomers, for example, diallyl carboxylates such as diallyl phthalate, diallyl maleate, diallyl itaconate, diallyl terephthalate, and diallyl adipate;

allylamino group-containing monomers, for example, diallylamine compounds (such as diallylamine, and diallylmethylamine), and triallylamines;

allylammonium group-containing monomers, for example, diallylammonium salts such as diallyldimethylammonium chloride;

triallyl isocyanurate;

1,3-diallyl urea;

triallyl phosphate; and diallyl disulfide.

Preferred for reactivity and ease of control of polymerization are diallyl ether compounds.

Other examples of the monomer having two or more ethylenic double bonds include:

monomers having (meth)acrylic acids such as ethylene glycol di(meth)acrylate, diethylene glycol di(meth)acrylate, triethylene glycol di(meth)acrylate, polyethylene glycol di(meth)acrylate, propylene glycol di(meth)acrylate, polypropylene glycol di(meth)acrylate, glycerin di(meth)acrylate, glycerin tri(meth)acrylate, pentaerythritol tri(meth)acrylate, trimethylolpropane tri(meth)acrylate, ditrimet hylolpropane tetra(meth)acrylate, pentaerythritol tetra(meth)acrylate, dipentaerythritol hexa(meth)acrylate, and isocyanuric acid tri(meth)acrylate;

monomers having (meth)acrylamides such as N,N'-methylene bis(meth)acrylamide, and N,N'-ethylene bis(meth)acrylamide;

divinylbenzene; and trivinylbenzene.

The copolymerization of the vinyl ester monomer and the monomer having two or more ethylenic double bonds may involve copolymerization of other monomers, provided that it is not detrimental to the gist of the present invention. Examples of such other monomers include:

α-olefins such as ethylene and propylene;

(meth)acrylic acids and salts thereof, (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate;

(meth)acrylamides;

derivatives of (meth)acrylamides, such as N-methyl (meth)acrylamide, N-ethyl(meth)acrylamide, N, N-dimethyl (meth)acrylamide, diacetone(meth)acrylamide, (meth)acrylamidepropanesulfonic acid and salts thereof, (meth)

acrylamidepropyldimethylamine and salts thereof or quaternary salts thereof, and N-methylol(meth)acrylamide and derivatives thereof, vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;

nitriles such as acrylonitrile and methacrylonitrile;

vinyl halides such as vinyl chloride and vinyl fluoride;

vinylidene halides such as vinylidene chloride and vinylidene fluoride;

allyl compounds such as ally acetate and allyl chloride;

unsaturated dicarboxylic acids such as maleic acid, itaconic acid, and fumaric acid, and salts or esters thereof, vinyl silyl compounds such as vinyltrimethoxysilane; and isopropenyl acetate.

When copolymerized, these monomers are copolymerized in an amount of typically 5 mol % or less.

It is preferable that the polymerization step in method (i) use a solvent, and that the mass ratio of the vinyl ester monomer to the solvent be vinyl ester monomer/solvent=100/0 to 90/10. With a solvent mass fraction of more than 10, the performance tends to decrease when the dispersion stabilizer is used for suspension polymerization of a vinyl compound.

In the polymerization steps of methods (i) and (ii), monomers other than the vinyl ester monomer may be copolymerized, provided that it is not detrimental to the gist of the present invention. By copolymerizing other monomers with the vinyl ester monomer, the resulting polymer can have a structure of other monomer units in its main chain. Examples of such other monomers include:

α-olefins such as ethylene and propylene;

(meth)acrylic acids and salts thereof, (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate;

(meth)acrylamides;

derivatives of (meth)acrylamides, such as N-methyl (meth)acrylamide, N-ethyl(meth)acrylamide, N, N-dimethyl (meth)acrylamide, diacetone(meth)acrylamide, (meth)acrylamidepropanesulfonic acid and salts thereof, (meth) acrylamidepropyldimethylamine and salts thereof or quaternary salts thereof, and N-methylol(meth)acrylamide and derivatives thereof, vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;

nitriles such as acrylonitrile and methacrylonitrile;

vinyl halides such as vinyl chloride and vinyl fluoride;

vinylidene halides such as vinylidene chloride and vinylidene fluoride;

allyl compounds such as allyl acetate and allyl chloride;

unsaturated dicarboxylic acids such as maleic acid, itaconic acid, and fumaric acid, and salts or esters thereof, vinyl silyl compounds such as vinyltrimethoxysilane; and isopropenyl acetate.

When copolymerized, a content of the monomer(s) is typically 5 mol % or less relative to all monomer units.

The solvent used in the polymerization steps of methods (i) and (ii) is preferably an alcohol. Examples of the alcohol include methanol, ethanol, and propanol. Preferred is methanol. These may be used alone, or two or more thereof may be used in combination.

When the vinyl ester monomer and the monomer having two or more ethylenic double bonds are copolymerized in the presence of an aldehyde having 2 to 8 carbon atoms used as a terminal modifying agent in method (ii), an aliphatic acyl group having 2 to 8 carbon atoms can be introduced to a terminal of the vinyl ester copolymer produced, and the PVA(A) obtained in the next saponification step can have an aliphatic acyl group having 2 to 8 carbon atoms on one of its terminals. The terminal modifying agent is used in an amount of preferably 0.5 mass % to 10 mass %, more preferably 1 mass % to 5 mass % relative to the vinyl ester monomer.

Examples of the aldehyde having 2 to 8 carbon atoms used as a terminal modifying agent include acetaldehyde, propyl aldehyde, butyl aldehyde, isobutyl aldehyde, pentyl aldehyde, hexyl aldehyde, heptyl aldehyde, and octyl aldehyde. For polymerization stability and water solubility of when the dispersion stabilizer is used for suspension polymerization of a vinyl compound, the aldehyde having 2 to 8 carbon atoms is preferably an aldehyde having 2 to 4 carbon atoms, more preferably acetaldehyde or butyl aldehyde, even more preferably acetaldehyde.

It is important in the polymerization step of method (ii) that the mass ratio of the vinyl ester monomer to the solvent (vinyl ester monomer/solvent) be 100/0 to 80/20. The mass ratio is preferably 100/0 to 90/10, more preferably 100/0 to 95/5. With the mass ratio of the vinyl ester monomer and the solvent falling in these ranges, the reaction efficiency of the terminal modifying agent can be controlled, and the PVA(A) produced can have an absorbance (x) at 280 nm in the foregoing ranges in an ultraviolet absorption spectrum of a 0.1 mass % aqueous solution. A smaller proportion of the vinyl ester monomer lowers the reaction efficiency of the terminal modifying agent, and the polymerization stability tends to decrease when the dispersion stabilizer is used for suspension polymerization of a vinyl compound.

The polymerization initiator used in the polymerization steps of methods (i) and (ii) is not particularly limited, and may be selected from known polymerization initiators according to the polymerization method. Examples of the polymerization initiator include azo polymerization initiators, peroxide polymerization initiators, and redox polymerization initiators. Examples of the azo polymerization initiators include 2,2'-azobis(2,4-dimethylvaleronitrile), 2,2'-azobis(isobutyronitrile), and 2,2'-azobis(4-methoxy-2,4-dimethylvaleronitrile). Examples of the peroxide polymerization initiators include peroxycarbonate compounds such as diisopropyl peroxydicarbonate, di(2-ethylhexyl)peroxydicarbonate, and diethoxyethyl peroxydicarbonate; perester compounds such as t-butyl peroxyneodecanoate, and cumyl peroxyneodecanoate; acetylcyclohexylsulfonylperoxide; and 2,4,4-trimethylpentyl-2-peroxyphenoxyacetate. Examples of the redox polymerization initiators include combinations of oxidizing agents and reducing agents. The oxidizing agents are preferably peroxides. Examples of the reducing agents include metal ions, and reducing compounds. Examples of the combinations of oxidizing agents and reducing agents include combinations of peroxides and metal ions; combinations of peroxides and reducing compounds; and combinations of peroxides, metal ions, and reducing compounds. Examples of the peroxides include hydrogen peroxide, and hydroperoxides such as cumene hydroperoxide and t-butyl hydroperoxide, persulfates (potassium, sodium, or ammonium salts), t-butyl peroxyacetate, and peracid esters (t-butyl peroxybenzoate). Examples of the metal ions include metal ions capable of accepting a single electron, such as $Fe^{2+}$, $Cr^{2+}$, $V^{2+}$, $Co^{2+}$, $Ti^{3+}$, and $Cu+$.

Examples of the reducing compounds include sodium bisulfite, sodium bicarbonate, tartaric acid, fructose, dextrose, sorbose, inositol, Rongalite, and ascorbic acid. Preferred are combinations of one or more peroxides selected from the group consisting of hydrogen peroxide, potassium persulfate, sodium persulfate, and ammonium persulfate, and one or more reducing agents selected from the group consisting of sodium bisulfite, sodium bicarbonate, tartaric acid, Rongalite, and ascorbic acid. More preferred are combinations of hydrogen peroxide and one or more reducing agents selected from the group consisting of sodium bisulfite, sodium bicarbonate, tartaric acid, Rongalite, and ascorbic acid. The polymerization initiator may be a water-soluble polymerization initiator such as potassium persulfate, ammonium persulfate, hydrogen peroxide, and cumene hydroperoxide combined with any of the foregoing polymerization initiators. These polymerization initiators may be used alone, or two or more thereof may be used in combination.

The polymerization regulator used in method (i) is preferably an aldehyde. Examples of the aldehyde include acetaldehyde, propyl aldehyde, butyl aldehyde, isobutyl aldehyde, pentyl aldehyde, hexyl aldehyde, heptyl aldehyde, and octyl aldehyde. From the viewpoints of the water solubility of the PVA(A) produced, and the polymerization stability of when the dispersion stabilizer is used for suspension polymerization of a vinyl compound, the aldehyde is preferably an aldehyde having 2 to 4 carbon atoms, more preferably acetaldehyde, propyl aldehyde, or butyl aldehyde. For availability, acetaldehyde is even more preferred. The polymerization regulator is used in an amount of preferably 0.5 mass % to 10 mass %, more preferably 1 mass % to 5 mass % relative to the vinyl ester monomer.

The polymerization conversion rate of the vinyl ester monomer in the polymerization step of method (i) is not particularly limited, and is preferably 20% or more and less than 90%, more preferably 25% or more and less than 80%, even more preferably 30% or more and less than 60%. A polymerization conversion rate of less than 20% results in poor productivity. A polymerization conversion rate of 90% or more tends to impair the hue of the PVA(A), or lower the performance of PVA(A) when it is used as a dispersion stabilizer for suspension polymerization of a vinyl compound. The polymerization conversion rate in the polymerization step of method (ii) is not particularly limited, and is preferably 20% or more and less than 90%, more preferably 25% or more and less than 80%, even more preferably 30% or more and less than 60%. A polymerization conversion rate of less than 20% results in poor productivity. A polymerization conversion rate of 90% or more tends to impair the hue of the PVA(A), or lower the performance of PVA(A) when it is used as a dispersion stabilizer for suspension polymerization of a vinyl compound.

The method for saponifying the vinyl ester polymer obtained in the polymerization steps of methods (i) and (ii) is not particularly limited, and the saponification may be achieved by using a known saponification method. Examples of such methods include alcoholysis reaction or hydrolysis reaction using a basic catalyst such as sodium hydroxide, potassium hydroxide, or sodium methoxide, or an acid catalyst such as p-toluenesulfonic acid. Examples of the solvent that can be used for such reactions include alcohols such as methanol and ethanol; esters such as methyl acetate and ethyl acetate; ketones such as acetone and methyl ethyl ketone; and aromatic hydrocarbons such as benzene and toluene. These solvents may be used alone, or two or more thereof may be used in combination. For convenience, it is preferable to carry out the saponification by using methanol or a mixed solution of methanol and methyl acetate as solvent, and sodium hydroxide as catalyst. The water content in the saponification reaction solution in the saponification step is preferably 3 mass % or less, more preferably 2 mass % or less, even more preferably 1 mass % or less.

The vinyl alcohol polymer (X) (hereinafter, referred to as "PVA(X)" for short) obtained in the saponification step of method (i) is reacted with an esterification agent to introduce a modifying group (preferably, at least one group selected from the group consisting of an itaconyl group, a methacryloyl group, and an acryloyl group) to a side chain of PVA(X). Preferred examples of the esterification agent include itaconic acid or salts thereof, itaconic anhydride, itaconic acid monoalkyl ester, itaconic acid dialkyl ester, methacrylic acid or salts thereof, methacrylic anhydride, methacrylic acid monoalkyl ester, acrylic acid or salts thereof, acrylic anhydride, and acrylic acid monoalkyl ester. More preferred for reactivity to PVA(X) are itaconic acid, itaconic anhydride, methacrylic acid, methacrylic anhydride, acrylic acid, and acrylic anhydride. The esterification agent is used in an amount of preferably 0.5 mass % to 10 mass %, more preferably 1 mass % to 6 mass % relative to PVA(X).

It is preferable to apply heat to promote a reaction of PVA(X) and the esterification agent. The heating temperature is preferably 50° C. to 200° C. The reaction time is typically 10 minutes to 24 hours.

The PVA(A) has a low level of water-insoluble content in the form of an aqueous solution. Specifically, the water-insoluble content (ppm) of PVA(A) are preferably 1,000 ppm or less, more preferably 800 ppm or less, even more preferably 600 ppm or less. The water-insoluble content (ppm) of PVA(A) should be as small as possible, and may be 0 ppm or more, or more than 0 ppm. The water-insoluble content of PVA(A) are regarded as being 0 ppm when the measured water-insoluble content is below 0 ppm. Here, ppm means ppm by mass. The water-insoluble content measurement method is as described in the Examples below.

Use

The PVA(A) of the present invention has various uses. The following are non-limiting examples of possible uses.

(1) Dispersants: dispersion stabilizers for pigments contained in materials such as coating materials and adhesives; dispersion stabilizers and dispersion aids for suspension polymerization of various vinyl compounds such as vinyl chloride, vinylidene chloride, styrene, (meth)acrylate, and vinyl acetate (2) Coating agents: paper coating agents, sizing agents, textile processing agents, leather finishing agents, coating materials, anti-fogging agents, metal corrosion inhibitors, gloss agents for zinc plating, antistatic agents, and medical coating agents (3) Adhesives: adhesives, pressure sensitive adhesives, rewetting adhesives, various binders, and additives for cements and mortars (4) Emulsifiers: emulsifiers for emulsion polymerization, and post-emulsifiers for substances such as bitumen (5) Flocculants: flocculants for suspended and dissolved matter in water, and metal flocculants (6) Paper processing: paper strength enhancers, oil- and solvent-resistance imparting agents, smoothness improving agents, auxiliary agents for surface gloss improvement, sealing agents, barrier agents, lightfastness imparting agents, waterproofing agents, dispersants for dyes and color-developing agents, adhesion improving agents, and binders (7) Agriculture: agrichemical binders, agrichemical spreading agents, agricultural coating agents, soil improvers, erosion preventing agents, and agrichemical dispersants (8) Medicine and cosmetics: granulating binders, coating agents, emulsifiers, patches, binders, film formulation bases, and film-forming agents (9) Viscosity adjustments: thickeners, and rheology adjusters

(10) Films: water-soluble films, polarizing films, barrier films, textiles wrapping films, seedling protecting sheets, vegetation sheets, seed tapes, and hygroscopic films

(11) Molded items: fibers, pipes, tubes, leak-proof films, water-soluble fibers for chemical laces, and sponges

(12) Gels: medical gels, industrial gels

(13) Post-reactions: post-reactions with low-molecular organic compounds, high-molecular organic compounds, and inorganic compounds The PVA(A) of the present invention is particularly preferable for use in dispersant applications, as will be described later.

The dispersion stabilizer for suspension polymerization of the present invention may contain various additives, provided that it is not detrimental to the effects of the present invention. Examples of such additives include: polymerization regulators such as aldehydes, halogenated hydrocarbons, and mercaptans; polymerization inhibitors such as phenol compounds, sulfur compounds, and N-oxide compounds; pH adjusters; cross-linking agents; preservatives; mildewcides; antiblocking agents; antifoaming agents; and compatibilizing agents. The content of such additive(s) in the dispersion stabilizer for suspension polymerization is preferably 10 mass % or less, more preferably 5 mass % or less relative to the total dispersion stabilizer for suspension polymerization.

Vinyl Polymer Producing Method

Another preferred embodiment of the present invention is a method for producing a vinyl polymer comprising subjecting a vinyl compound to suspension polymerization in the presence of the PVA(A)-containing dispersion stabilizer for suspension polymerization of the present invention. The method produces a particulate vinyl polymer.

The PVA(A)-containing dispersion stabilizer for suspension polymerization of the present invention can be charged into an polymerization vessel by using, for example, (i) a method that charges the dispersion stabilizer into a polymerization vessel in the form of an aqueous solution, or (ii) a method that charges the dispersion stabilizer in an as-produced powder form. The method (i) is more preferred in terms of uniformity in the polymerization vessel.

Examples of the vinyl compounds include vinyl halides such as vinyl chloride; vinyl esters such as vinyl acetate and vinyl propionate; acrylic acid, methacrylic acid, and esters and salts thereof maleic acid, fumaric acid, and esters and anhydrides thereof styrene, acrylonitrile, vinylidene chloride, and vinyl ether. These may be used alone, or two or more thereof may be used in combination. Preferred is vinyl chloride, and vinyl chloride is used preferably with a monomer capable of copolymerizing with vinyl chloride. Examples of the monomer capable of copolymerizing with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic acid and itaconic acid; and acrylonitrile, styrene, vinylidene chloride, and vinyl ether.

For suspension polymerization of a vinyl compound, an oil-soluble or water-soluble polymerization initiator, which is conventionally used for polymerization of vinyl chloride, can be used. Examples of the oil-soluble polymerization initiator include:

peroxycarbonate compounds such as diisopropyl peroxydicarbonate, di-2-ethylhexyl peroxydicarbonate, and diethoxyethyl peroxydicarbonate;

perester compounds such as t-butyl peroxyneodecanoate, t-butyl peroxypivalate, t-hexyl peroxypivalate, and cumyl peroxyneodecanoate;

peroxides such as acetylcyclohexylsulfonylperoxide, 2,4,4-trimethylpentyl-2-peroxyphenoxyacetate, 3,5,5-trimethylhexanoylperoxide, and lauroyl peroxide; and azo compounds such as 2,2'-azobis(2,4-dimethylvaleronitrile), 2,2'-azobis(isobutyronitrile), and 2,2'-azobis(4-methoxy-2,4-dimethylvaleronitrile).

Examples of the water-soluble polymerization initiator include potassium persulfate, ammonium persulfate, hydrogen peroxide, and cumene hydroperoxide. These polymerization initiators may be used alone, or two or more thereof may be used in combination.

In suspension polymerization of a vinyl compound, the polymerization temperature is not particularly limited, and may be a low temperature of about 20° C., or a high temperature of more than 90° C. Preferably, the polymerization temperature is about 20 to 60° C. A polymerization vessel equipped with a reflux condenser may be used in order to increase the heat removal efficiency of the polymerization reaction system.

The resulting vinyl polymer can be used for formation of various molded products by adding additive(s) such as a plasticizer, as needed.

In suspension polymerization of a vinyl compound, the amount (concentration) of the dispersion stabilizer for suspension polymerization of the present invention may be 1,000 ppm or less, 800 ppm or less, 600 ppm or less, 400 ppm or less, or 200 ppm or less relative to the vinyl compound. Here, ppm means ppm by mass.

From the viewpoints of further reducing fisheyes and further improving plasticizer absorptivity in the vinyl polymer produced, it is preferable that the suspension polymerization of a vinyl compound be carried out in the presence of PVA(A) and a vinyl alcohol polymer (B) (hereinafter, also referred to as "PVA(B)" for short) having a viscosity-average degree of polymerization of less than 600, and a degree of saponification of more than 30 mol % and less than 60 mol %. The viscosity-average degree of polymerization and the degree of saponification of PVA(B) are measured values according to JIS K 6726:1994, as with the case of PVA(A).

The viscosity-average degree of polymerization of PVA (B) is more preferably less than 500, even more preferably less than 400, particularly preferably less than 300. When the viscosity-average degree of polymerization of PVA(B) is 600 or more, the polymerization stability tends to decrease, or the resulting vinyl polymer tends to have a reduced plasticizer absorptivity when the dispersion stabilizer is used for suspension polymerization of a vinyl compound.

The degree of saponification of PVA(B) is preferably more than 35 mol % and less than 57 mol %, more preferably more than 40 mol % and less than 55 mol %. When the degree of saponification of PVA(B) is 30 mol % or less, the hydrophobicity becomes overly high, and the polymerization stability tends to decrease, and the resulting vinyl polymer tends to have a reduced plasticizer absorptivity when the dispersion stabilizer is used for suspension polymerization of a vinyl compound. When the degree of saponification is 60 mol % or more, the polymerization stability tends to decrease, and the resulting vinyl polymer tends to have a reduced plasticizer absorptivity, resulting in an increased number of fisheyes.

For suspension polymerization of a vinyl compound, the PVA(A) may be used with materials commonly used for suspension polymerization of a vinyl compound in an aqueous vehicle. Examples of such materials include:

water-soluble cellulose ethers such as methyl cellulose, hydroxyethyl cellulose, hydroxypropyl cellulose, and hydroxypropyl methyl cellulose;

water-soluble polymers such as gelatin;

oil-soluble emulsifiers such as sorbitan monolaurate, sorbitan trioleate, glycerin tristearate, and an ethylene oxide-propylene oxide block copolymer; and water-soluble emulsifiers such as polyoxyethylene sorbitan monolaurate, polyoxyethylene glyceryl oleate, and sodium laurate.

The material(s) may be added in any amounts, preferably 0.01 parts by mass to 1.0 parts by mass per 100 parts by mass of the vinyl compound.

A preferred embodiment (Y) of a dispersion stabilizer for suspension polymerization of the present invention is, for example, a dispersion stabilizer for suspension polymerization comprising a vinyl alcohol polymer (A) having a viscosity-average degree of polymerization of more than 400 and less than 1,000, a degree of saponification of more than 67 mol % and less than 78 mol %, 0.02 mol % to 1.0 mol % of a group having an ethylenic double bond in its side chain, a terminal with an aliphatic acyl group having 2 to 8 carbon atoms, and an absorbance (x) at 280 nm of more than 0.32 and less than 0.65 in an ultraviolet absorption spectrum of a 0.1 mass % aqueous solution. The aliphatic acyl group is preferably an aliphatic acyl group having 2 to 4 carbon atoms, more preferably an acetyl group.

A preferred embodiment (Z) of a dispersion stabilizer for suspension polymerization of the present invention is, for example, a dispersion stabilizer for suspension polymerization comprising a vinyl alcohol polymer (A) having a viscosity-average degree of polymerization of more than 400 and less than 1,000, a degree of saponification of more than 67 mol % and less than 78 mol %, 0.05 mol % to 0.5 mol % of at least one group in its side chain selected from the group consisting of an itaconyl group, a methacryloyl group, and an acryloyl group, and an absorbance (x) at 280 nm of more than 0.17 and less than 0.50 in an ultraviolet absorption spectrum of a 0.1 mass % aqueous solution. Preferably, the vinyl alcohol polymer (A) in the dispersion stabilizer for suspension polymerization of embodiment (Z) has a terminal with 0.0005 mol % to 0.1 mol % of a propyl group.

In both embodiments (Y) and (Z), the numerical values concerning the components may be appropriately changed, and various changes may be made to the components, including addition and deletion of any components, in accordance with the foregoing descriptions. In these embodiments, it is also possible to appropriately change and combine the values of the components and various properties (e.g., water-insoluble content) of the vinyl alcohol polymer (A). For example, in embodiments (Y) and (Z), the water-insoluble content (ppm) of the vinyl alcohol polymer (A) may be 1,000 ppm or less.

The present invention encompasses combinations of the foregoing features, provided that such combinations made in various forms within the technical idea of the present invention can produce the effects of the present invention.

EXAMPLES

The following describes the present invention in greater detail by way of Examples. In the following Examples and Comparative Examples, "part(s)" and "%" are by mass, and "ppm" means ppm by mass, unless otherwise specifically stated.

Viscosity-Average Degree of Polymerization of PVA(A)

The viscosity-average degree of polymerization of PVA (A) was measured according to JIS K 6726:1994. Specifically, when PVA(A) had a degree of saponification of less than 99.5 mol %, the PVA(A) was saponified until the degree of saponification reached at least 99.5 mol %, and the viscosity-average degree of polymerization (P) was measured from the limiting viscosity $[\eta]$ (L/g) measured in water at 30° C., using the following formula.

$$P=([\eta]\times 10^4/8.29)^{(1/0.62)}$$

Degree of Saponification of PVA(A)

The degree of saponification of PVA(A) was measured according to JIS K 6726:1994.

Content of Terminal Propyl Group of PVA(A)

The content of the terminal propyl group of PVA(A) was measured as follows. A 10 mass % aqueous solution of PVA(A) was prepared, and 5 g of the aqueous solution was dropped in 500 g of a 95:5 solution of methyl acetate and water to precipitate PVA(A). The PVA(A) was collected, dried, and isolated, and dissolved in DMSO-$d_6$ for $^1$H-NMR measurement at 400 MHz. The $^1$H-NMR spectrum had a peak derived from the methine of the vinyl alcohol unit near 3.2 to 4.0 ppm (integral value [M]), and a peak attributed to the proton derived from the methyl of the propyl group near 0.7 to 1.0 ppm (integral value [N]). The content of the terminal propyl group was determined from these peaks using the following formula.

$$\text{Content of terminal propyl group (mol \%)}=([N]/3)/[M]\times 100$$

Content of Modifying Group in the Side Chain of PVA(A)

The content of the modifying group in the side chain of the PVA(A) was measured and calculated as follows. First, a 10 mass % aqueous solution of PVA(A) was prepared. Five grams of the aqueous solution was then dropped in 500 g of a 95:5 solution of methyl acetate and water to precipitate PVA(A). The PVA(A) was collected, dried, and isolated, and dissolved in DMSO-$d_6$ for $^1$H-NMR measurement at 400 MHz. The $^1$H-NMR spectrum had a peak derived from the methine of the vinyl alcohol unit near 3.2 to 4.0 ppm (integral value [P]), and a number of peaks attributed to the protons derived from the modifying group in the side chain near 5.0 to 6.5 ppm (any of the peaks is usable; integral value [Q]). The content of the modifying group in the side chain was determined from these peaks using the following formula.

$$\text{Content of modifying group in the side chain (mol \%)}=[Q]/[P]\times 100$$

UV Absorption Spectral Absorbance of PVA(A)

A 0.1% by mass aqueous solution of PVA(A) was prepared. The aqueous solution was charged into a cell having a 1-cm light path, and was measured for absorbance (x) at 280 nm using an ultraviolet-visible spectrophotometer (UV-2450, manufactured by Shimadzu Corporation).

Water-Insoluble Content in PVA(A) Aqueous Solution

One-hundred grams of a 4 mass % aqueous solution of PVA(A) was prepared, and the total amount was filtered through a 200-mesh metal sieve (equivalent to a JIS standard sieve mesh size of 75 μm; the mesh size is in compliance with the nominal opening W of JIS Z 8801-1-2006), and the trapped solids were dried at 105° C. for 3 hours, together with the sieve (the mass of the metal sieve before filtration is a (g), and the total absolute dry mass of the sieve and the remaining substance on the sieve is b (g)). The water-insoluble content (ppm) were determined using the following formula.

Water-insoluble content (ppm)=1,000,000×(b−a)/4

Production Example 1-1: Production of PVA(A1-1)

A polymerization vessel was charged with 1,500 parts of vinyl acetate (hereinafter, also referred to as "VAc" for short), 30 parts of methanol, and 6.7 parts of trimethylolpropane diallyl ether. After nitrogen replacement, 25.5 parts of acetaldehyde was additionally charged into the vessel, and the mixture was heated to 60° C. to initiate polymerization. The polymerization was carried out in the presence of 2,2'-azobis(isobutyronitrile) as an initiator, and was continued until a polymerization conversion rate of 50% was achieved. The remaining VAc was then removed from the system with methanol in a procedure performed under reduced pressure while adding methanol. This yielded a 50 mass % methanol solution of vinyl ester copolymer (hereinafter, also referred to as "PVAc"). The methanol solution of vinyl ester copolymer was diluted to 30 mass % with a mixed solvent of methanol and methyl acetate (the methyl acetate concentration is 10 mass % of the whole saponification system), and this was followed by a saponification reaction, which was carried out for 1 hour at 40° C. with a saponification reaction solution containing 1 mass % water, using sodium hydroxide as a saponification catalyst in a mole ratio of 0.0106 with respect to PVAc. The PVA was then immersed and washed in an 80:20 washing solution of methyl acetate and methanol. Upon centrifugal removal of solvent and subsequent drying, a PVA(A1-1) was obtained that had a viscosity-average degree of polymerization of 750, a degree of saponification of 72 mol %, and a content of an allyl ether group of 0.13 mol %, and that contained an acetyl group on one of its terminals, and had an absorbance value (x) at 280 nm of 0.412 in an ultraviolet absorption spectrum of a 0.1 mass % aqueous solution.

Production Examples 1-2 to 1-16: Production of PVA(A1-2) to PVA(A1-16)

PVA(A1-2) to PVA(A1-16) were produced in the same manner as in Production Example 1, except that the vinyl acetate and methanol contents, the type and content of monomer having two or more ethylenic double bonds, the type and content of terminal modifying agent, the polymerization conversion rate, and the saponification conditions were varied as shown in Tables 1 to 3. Table 1 shows the production conditions and results. Table 2 shows the types of monomers used. Table 3 shows the types of terminal modifying agents used.

TABLE 1

| | | Polymerization conditions | | | | | |
| | | Vinyl acetate Parts | Methanol Parts | Comonomer | | Terminal modifying agent | | Polymerization conversion rate % |
| | PVA | | | Type | Added parts | Type | Added parts | |
| --- | --- | --- | --- | --- | --- | --- | --- | --- |
| Production Example 1-1 | PVA(A1-1) | 1500 | 30 | A | 6.7 | A | 25.5 | 50 |
| Production Example 1-2 | PVA(A1-2) | 1500 | 30 | A | 6.7 | A | 30.0 | 40 |
| Production Example 1-3 | PVA(A1-3) | 1500 | 50 | B | 4.4 | A | 22.5 | 50 |
| Production Example 1-4 | PVA(A1-4) | 1500 | 100 | A | 22.0 | A | 35.0 | 25 |
| Production Example 1-5 | PVA(A1-5) | 1500 | 0 | A | 6.7 | B | 45.0 | 50 |
| Production Example 1-6 | PVA(A1-6) | 1500 | 0 | A | 6.7 | A | 25.5 | 50 |
| Production Example 1-7 | PVA(A1-7) | 1500 | 0 | A | 6.7 | A | 25.5 | 50 |
| Production Example 1-8 | PVA(A1-8) | 1500 | 0 | A | 6.7 | C | 74.2 | 50 |
| Production Example 1-9 | PVA(A1-9) | 1500 | 0 | — | — | A | 23.0 | 30 |
| Production Example 1-10 | PVA(A1-10) | 1500 | 0 | A | 6.7 | A | 25.5 | 50 |
| Production Example 1-11 | PVA(A1-11) | 1500 | 0 | A | 6.7 | A | 25.5 | 50 |
| Production Example 1-12 | PVA(A1-12) | 1500 | 1200 | A | 6.4 | A | 25.0 | 45 |
| Production Example 1-13 | PVA(A1-13) | 1500 | 1500 | A | 5.0 | A | 42.0 | 40 |
| Production Example 1-14 | PVA(A1-14) | 1500 | 0 | A | 7.3 | A | 21.5 | 60 |
| Production Example 1-15 | PVA(A1-15) | 1500 | 3000 | A | 54.7 | A | 5.0 | 40 |
| Production Example 1-16 | PVA(A1-16) | 1500 | 30 | A | 7.4 | A | 63.0 | 70 |

| | Saponification conditions | | |
| | Saponification concentration (%) | Saponification system water content (%) | NaOH mole ratio |
| --- | --- | --- | --- |
| Production Example 1-1 | 30 | 1 | 0.0106 |
| Production Example 1-2 | 30 | 1 | 0.0115 |
| Production Example 1-3 | 30 | 1 | 0.0098 |
| Production Example 1-4 | 30 | 1 | 0.0168 |
| Production Example 1-5 | 30 | 1 | 0.0106 |
| Production Example 1-6 | 30 | 1 | 0.0104 |
| Production Example 1-7 | 30 | 1 | 0.0108 |
| Production Example 1-8 | 30 | 1 | 0.0106 |
| Production Example 1-9 | 30 | 1 | 0.0088 |
| Production Example 1-10 | 30 | 1 | 0.0102 |
| Production Example 1-11 | 30 | 1 | 0.0118 |
| Production Example 1-12 | 30 | 1 | 0.0093 |
| Production Example 1-13 | 30 | 1 | 0.0125 |
| Production Example 1-14 | 30 | 1 | 0.0100 |

TABLE 1-continued

| | | | | Analysis values for PVA(A) | |
| --- | --- | --- | --- | --- | --- |
| | | Degree of polymerization | Degree of saponification mol % | Content of modifying group which is vinyl ether or allyl ether group mol % | UV absorbance (x) at 280 nm |
| Production Example 1-1 | | 750 | 72 | 0.13 | 0.412 |
| Production Example 1-2 | | 500 | 72 | 0.14 | 0.433 |
| Production Example 1-3 | | 900 | 72 | 0.13 | 0.355 |
| Production Example 1-4 | | 800 | 72 | 0.55 | 0.535 |
| Production Example 1-5 | | 750 | 72 | 0.13 | 0.410 |
| Production Example 1-6 | | 750 | 69 | 0.13 | 0.408 |
| Production Example 1-7 | | 750 | 75 | 0.13 | 0.415 |
| Production Example 1-8 | | 750 | 72 | 0.13 | 0.410 |
| Production Example 1-9 | | 750 | 72 | — | 0.270 |
| Production Example 1-10 | | 750 | 65 | 0.13 | 0.402 |
| Production Example 1-11 | | 750 | 82 | 0.13 | 0.423 |
| Production Example 1-12 | | 900 | 72 | 0.13 | 0.198 |
| Production Example 1-13 | | 220 | 72 | 0.11 | 0.220 |
| Production Example 1-14 | | 1200 | 72 | 0.13 | 0.347 |
| Production Example 1-15 | | 750 | 72 | 1.20 | 0.050 |
| Production Example 1-16 | | 740 | 72 | 0.09 | 0.699 |

Note: Rows 1-15 and 1-16 continued header values: 30, 1, 0.0200 and 30, 1, 0.0180 respectively.

TABLE 2

| Type | Comonomer |
| --- | --- |
| A | Trimethylolpropane diallyl ether |
| B | 1,4-Butanediol divinyl ether |

TABLE 3

| Type | Terminal modifying agent |
| --- | --- |
| A | Acetaldehyde |
| B | Butyl aldehyde |
| C | Octyl aldehyde |

Production Example 2-1: Production of PVA(A2-1)

A polymerization vessel was charged with 1,500 parts of vinyl acetate and 0.0338 parts of propanethiol. After nitrogen replacement, 19 parts of acetaldehyde was additionally charged into the polymerization vessel, and the vessel was heated to 60° C. to initiate polymerization. The polymerization was carried out in the presence of 2,2'-azobis(isobutyronitrile) as a polymerization initiator, and was continued until a polymerization conversion rate of 50% was achieved. The remaining VAc was then removed from the system with methanol in a procedure performed under reduced pressure while adding methanol. This yielded a 50 mass % methanol solution of vinyl ester polymer (hereinafter, also referred to as "PVAc"). The methanol solution of PVAc was diluted to 30 mass % with methanol solvent, and this was followed by a saponification reaction, which was carried out for 1 hour at 40° C. with a saponification reaction solution containing 1 mass % water, using sodium hydroxide as a saponification catalyst in a mole ratio of 0.007 with respect to PVAc. The resulting vinyl alcohol polymer was then immersed and washed in an 80:20 washing solution of methyl acetate and methanol. After centrifugal removal of solvent and subsequent drying, a solution prepared by dissolving 4 parts of itaconic acid as an esterification agent in 16 parts of methanol was added to 100 parts of the vinyl alcohol polymer (PVA(X)), and the mixture was subjected to a heat treatment at 110° C. for 4 hours. The resulting PVA(A) (PVA(A2-1)) had a viscosity-average degree of polymerization of 740, a degree of saponification of 72 mol %, a terminal propyl group content of 0.0051 mol %, a content of an itaconyl group content of 0.11 mol % in the side chain, and an absorbance (x) at 280 nm of 0.293 in an ultraviolet absorption spectrum of a 0.1 mass % aqueous solution. The PVA(A2-1) had a water-insoluble content of 80 ppm as measured using the foregoing method.

Production Examples 2-2 to 2-13: Production of PVA(A2-2) to PVA (A2-13)

PVA(A2-2) to PVA(A2-13) were produced in the same manner as in Production Example 2-1, except that vinyl acetate, and methanol, propanethiol, and acetaldehyde used for polymerization were used in the amounts shown in Table 4, or were not used as shown in the table, and that the polymerization conversion rate at the end of the polymerization reaction, the saponification conditions, and the type and amount of esterification agent were varied as shown in Table 4. Table 4 shows the production conditions. Table 6 shows the results.

TABLE 4

| | | Polymerization conditions | | | | |
|---|---|---|---|---|---|---|
| | PVA | Vinyl acetate (Parts) | Methanol (Parts) | Propanethiol (Parts) | Acetaldehyde (Parts) | Polymerization conversion rate (%) |
| Production Example 2-1 | PVA(A2-1) | 1500 | 0 | 0.0338 | 19.0 | 50 |
| Production Example 2-2 | PVA(A2-2) | 1500 | 30 | 0.0239 | 35.0 | 30 |
| Production Example 2-3 | PVA(A2-3) | 1500 | 80 | 0.0179 | 16.0 | 50 |
| Production Example 2-4 | PVA(A2-4) | 1500 | 0 | 0.3114 | 19.0 | 45 |
| Production Example 2-5 | PVA(A2-5) | 1500 | 0 | 0.0338 | 19.0 | 50 |
| Production Example 2-6 | PVA(A2-6) | 1500 | 0 | 0.0338 | 19.0 | 50 |
| Production Example 2-7 | PVA(A2-7) | 1500 | 0 | 0.0338 | 19.0 | 50 |
| Production Example 2-8 | PVA(A2-8) | 1500 | 0 | — | 19.5 | 50 |
| Production Example 2-9 | PVA(A2-9) | 1500 | 0 | 0.9279 | 16.0 | 50 |
| Production Example 2-10 | PVA(A2-10) | 1500 | 1500 | — | — | 50 |
| Production Example 2-11 | PVA(A2-11) | 1500 | 0 | 0.0338 | 19.0 | 50 |
| Production Example 2-12 | PVA(A2-12) | 1500 | 0 | 0.0338 | 19.0 | 50 |
| Production Example 2-13 | PVA(A2-13) | 1500 | 150 | 0.0106 | 25.0 | 80 |

| | Saponification conditions | | | Esterification conditions | | | |
|---|---|---|---|---|---|---|---|
| | Saponification concentration (%) | Saponification system water content (%) | NaOH mole ratio | Temp. (° C.) | Time (hr) | Esterification agent Type | Amount (Parts) |
| Production Example 2-1 | 30 | 1 | 0.0070 | 110 | 4 | Itaconic acid | 4 |
| Production Example 2-2 | 30 | 1 | 0.0072 | 110 | 4 | Itaconic acid | 4 |
| Production Example 2-3 | 30 | 1 | 0.0068 | 110 | 4 | Methacrylic anhydride | 2 |
| Production Example 2-4 | 30 | 1 | 0.0070 | 110 | 4 | Acrylic anhydride | 2.5 |
| Production Example 2-5 | 30 | 1 | 0.0067 | 110 | 4 | Itaconic acid | 4 |
| Production Example 2-6 | 30 | 1 | 0.0074 | 110 | 4 | Itaconic acid | 4 |
| Production Example 2-7 | 30 | 1 | 0.0070 | 110 | 4 | Methacrylic anhydride | 0.8 |
| Production Example 2-8 | 30 | 1 | 0.0074 | 110 | 4 | Itaconic acid | 4 |
| Production Example 2-9 | 30 | 1 | 0.0067 | 110 | 4 | Itaconic acid | 4 |
| Production Example 2-10 | 30 | 1 | 0.0040 | 110 | 4 | Itaconic acid | 4 |
| Production Example 2-11 | 30 | 1 | 0.0062 | 110 | 4 | Itaconic acid | 4 |
| Production Example 2-12 | 30 | 1 | 0.0082 | 110 | 4 | Itaconic acid | 4 |
| Production Example 2-13 | 30 | 1 | 0.0058 | 110 | 4 | Itaconic acid | 4 |

Example 1-1

PVA(A1-1) as a dispersion stabilizer for suspension polymerization was dissolved in deionized water, and 100 parts of the PVA(A1-1) aqueous solution was charged into an autoclave. Here, PVA(A1-1) was charged in an amount that makes the PVA(A1-1) concentration 800 ppm with respect to the amount of the vinyl chloride (VCM) charged. Thereafter, 100 parts of vinyl alcohol polymer (PVA(B)) having a viscosity-average degree of polymerization of 250 and a degree of saponification of 50 mol % was charged in the form of a 2:8 solution of methanol and water. Here, PVA(B) was charged in an amount that makes the PVA(B) concentration 100 ppm with respect to the amount of the vinyl chloride (VCM) charged. Thereafter, deionized water was added to make the total fraction of deionized water 1,200 parts. This was followed by addition of 0.65 parts of a 70% toluene solution of cumyl peroxyneodecanoate, and 1.05 parts of a 70% toluene solution of t-butyl peroxyneodecanoate into an autoclave, and nitrogen was introduced into the autoclave until the pressure reached 0.2 MPa. Nitrogen purging was conducted a total of five times to thoroughly replace inside of the autoclave with nitrogen and remove oxygen. After this procedure, 940 parts of vinyl chloride was added. The contents inside the autoclave were then heated to 57° C. to initiate polymerization of vinyl chloride, with stirring. The autoclave had an inner pressure of 0.80 MPa at the start of polymerization. After about 3.5 hours from the start of polymerization, the polymerization was ceased at the timing when the pressure inside the autoclave reached 0.70 MPa. The polymerization product was taken out after removing unreacted vinyl chloride. The product was then dried at 65° C. for 16 hours to obtain vinyl chloride polymer particles. The vinyl chloride polymer particles were evaluated as follows.

Evaluation of Vinyl Chloride Polymer Particles

The vinyl chloride polymer particles were evaluated for (1) average particle diameter, (2) particle size distribution, (3) plasticizer absorptivity, and (4) fisheyes, using the following methods. The evaluation results are presented in Table 5.

(1) Average Particle Diameter

The particle size distribution was measured according to the dry sieving method described in JIS Z 8815:1994, using a sieve that complied with Tyler Standard Sieve Series. The measurement results were plotted to create a Rosin-Rammler distribution, and the average particle diameter ($d_{p50}$) was calculated.

(2) Particle Size Distribution

The content of vinyl chloride polymer particles (% by mass) that did not pass through a 355-μm mesh sieve (equivalent to a JIS standard 42-mesh sieve) was evaluated using the following criteria. Here, the content means the percentage of particles accumulating on the sieve. The sieve opening complies with the nominal opening W of JIS Z 8801-1-2006.

A: less than 0.5%
B: 0.5% or more and less than 1.0%
C: 1.0% or more

The content of vinyl chloride polymer particles (% by mass) that passed through a 355-μm mesh sieve but did not pass through a 250-μm mesh sieve (equivalent to a JIS standard 60-mesh sieve) was evaluated using the following criteria. Here, the content means the percentage of particles accumulating on the sieve. The sieve opening complies with the nominal opening W of JIS Z 8801-1-2006.
A: less than 5%
B: 5% or more and less than 10%
C: 10% or more With regard to the vinyl chloride polymer particles that did not pass through the 355-μm mesh sieve and the vinyl chloride polymer particles that did not pass through the 250-μm mesh sieve, smaller content values of these polymer particles mean higher polymerization stability with fewer coarse particles and a sharper particle size distribution.

(3) Plasticizer Absorptivity

The mass (A (g)) of a 5-mL syringe filled with 0.02 g of absorbent cotton was measured, and 0.5 g of vinyl chloride polymer particles was added to the syringe and the combined mass (B (g)) was measured. After adding 1 g of dioctyl phthalate (DOP), the syringe was allowed to stand for 15 minutes, and centrifuged at 3,000 rpm for 40 minutes. The resulting mass (C (g)) was then measured. The plasticizer absorptivity (%) was determined from the calculation formula below. Higher values of plasticizer absorptivity mean that the product is more easily processable, and that fewer defects, such as seeding, occur on the exterior of the product, particularly when the polymer is processed into a sheet.

Plasticizer absorptivity (%)=100×[{(C−A)/(B−A)}−1]

(4) Fisheyes

The vinyl chloride polymer particles (100 parts), dioctylphthalate (50 parts), tribasic lead sulfate (5 parts), and zinc stearate (1 part) were roll kneaded at 150° C. for 7 minutes to produce a 0.1-mm thick sheet. The sheet was then measured for the number of fisheyes per 1,000 cm$^2$ by visual inspection. Fewer fisheyes mean that the sheet is less defective.

Examples 1-2 to 1-9

Suspension polymerization of vinyl chloride was conducted in the same manner as in Example 1-1, except that the PVAs(A) shown in Table 5 were used as dispersion stabilizers for suspension polymerization, and that PVA(B) was used or not used as shown in the table. The results are presented in Table 5. The dispersion stabilizers for suspension polymerization of the present invention did not produce vinyl chloride polymer particles of coarse particle sizes, and showed desirable polymerization stability with excellent plasticizer absorptivity. The fisheye counts were also small.

Comparative Example 1-1

Suspension polymerization of vinyl chloride was conducted in the same manner as in Example 1-1, except that PVA(A1-9) was used as PVA(A). The results are presented in Table 5. PVA(A1-9) did not have a group having an ethylenic double bond in its side chain, and, accordingly, the vinyl chloride polymer particles produced had a large average particle diameter with a large proportion of coarse particles. The polymerization stability was poor, and the plasticizer absorptivity was low. The fisheye count was high.

Comparative Example 1-2

Suspension polymerization of vinyl chloride was conducted in the same manner as in Example 1-1, except that PVA(A1-10) was used as PVA(A). The results are presented in Table 5. PVA(A1-10) had a small degree of saponification, and, accordingly, the vinyl chloride polymer particles produced had a large average particle diameter with a large proportion of coarse particles. The polymerization stability was poor, and the plasticizer absorptivity was low. The fisheye count was high.

Comparative Example 1-3

Suspension polymerization of vinyl chloride was conducted in the same manner as in Example 1-1, except that PVA(A1-11) was used as PVA(A). The results are presented in Table 5. PVA(A1-11) had an overly high degree of saponification, and the interfacial activity was insufficient. Accordingly, the vinyl chloride polymer particles produced had a large average particle diameter with a large proportion of coarse particles. The polymerization stability was poor, and the plasticizer absorptivity was low. The fisheye count was high.

Comparative Example 1-4

Suspension polymerization of vinyl chloride was conducted in the same manner as in Example 1-1, except that PVA(A1-12) was used as PVA(A). The results are presented in Table 5. PVA(A1-12) had an overly small absorbance value (x) at 280 nm in an ultraviolet absorption spectrum of a 0.1 mass % aqueous solution. Accordingly, the vinyl chloride polymer particles produced had a large average particle diameter with a large proportion of coarse particles. The polymerization stability was poor, and the plasticizer absorptivity was low. The fisheye count was high.

Comparative Example 1-5

Suspension polymerization of vinyl chloride was conducted in the same manner as in Example 1-1, except that PVA(A1-13) was used as PVA(A). The results are presented in Table 5. PVA(A1-13) had an overly low viscosity-average degree of polymerization. Accordingly, the vinyl chloride polymer particles produced had a large average particle diameter with a large proportion of coarse particles. The polymerization stability was poor, and the plasticizer absorptivity was low. The fisheye count was high.

Comparative Example 1-6

Suspension polymerization of vinyl chloride was conducted in the same manner as in Example 1-1, except that PVA(A1-14) was used as PVA(A). The results are presented in Table 5. PVA(A1-14) had an overly high viscosity-average degree of polymerization, and the interfacial activity was insufficient. Accordingly, the vinyl chloride polymer particles produced had a large average particle diameter with a large proportion of coarse particles. The polymerization stability was poor, and the plasticizer absorptivity was low. The fisheye count was high.

Comparative Example 1-7

Suspension polymerization of vinyl chloride was conducted in the same manner as in Example 1-1, except that PVA(A1-15) was used as PVA(A). The results are presented in Table 5. PVA(A1-15) had an overly high content of the modifying group having an ethylenic double bond in the side chan. Accordingly, the vinyl chloride polymer particles produced had a very low plasticizer absorptivity, and the fisheye count was very high.

Comparative Example 1-8

Suspension polymerization of vinyl chloride was conducted in the same manner as in Example 1-1, except that PVA(A1-16) was used as PVA(A). The results are presented in Table 5. PVA(A1-16) had an overly high absorbance value (x) at 280 nm in an ultraviolet absorption spectrum of a 0.1 mass % aqueous solution. Accordingly, the fisheye count was very high.

unreacted vinyl chloride. The product was then dried at 65° C. for 16 hours to obtain vinyl chloride polymer particles. The vinyl chloride polymer particles were evaluated using the foregoing methods.

Examples 2-2 to 2-9

Suspension polymerization of vinyl chloride was conducted in the same manner as in Example 1, except that PVA(A2-2) to PVA(A2-9) were used instead of PVA(A2-1). The evaluation results for the vinyl chloride polymer particles produced are presented in Table 6. The PVAs(A) of the present invention had low water-insoluble content despite having the ethylenic double bond, and, when the PVA(A) was used as a dispersion stabilizer for suspension polymerization, the vinyl chloride polymer produced had a small

TABLE 5

| | | | PVA(B) used with PVA(A) | | | Evaluation results for vinyl chloride polymer particles | | | | |
|---|---|---|---|---|---|---|---|---|---|---|
| | | | | | | Average | Particle size distribution | | | Fisheyes |
| | PVA(A) | Amount used (ppm/VCM) | Degree of polymerization | Degree of saponification (mol %) | Amount used (ppm/VAc) | particle diameter (μm) | Particles on 42 mesh | Particles on 60 mesh | Plasticizer absorptivity (%) | (Number of fisheyes/ 1,000 cm²) |
| Example 1-1 | PVA(A1-1) | 800 | 250 | 50 | 100 | 130.1 | A | A | 34.4 | 1 |
| Example 1-2 | PVA(A1-2) | 800 | 250 | 50 | 100 | 146.1 | A | A | 35.0 | 9 |
| Example 1-3 | PVA(A1-3) | 800 | 250 | 50 | 100 | 124.3 | A | A | 33.7 | 3 |
| Example 1-4 | PVA(A1-4) | 800 | 250 | 50 | 100 | 102.3 | A | A | 30.7 | 8 |
| Example 1-5 | PVA(A1-5) | 800 | 250 | 50 | 100 | 145.3 | A | A | 35.0 | 5 |
| Example 1-6 | PVA(A1-6) | 800 | 250 | 50 | 100 | 145.1 | B | A | 35.2 | 6 |
| Example 1-7 | PVA(A1-7) | 800 | 250 | 50 | 100 | 120.2 | B | A | 31.4 | 6 |
| Example 1-8 | PVA(A1-1) | 800 | — | — | — | 145.5 | B | A | 30.1 | 12 |
| Example 1-9 | PVA(A1-8) | 800 | 250 | 50 | 100 | 155.3 | B | B | 29.2 | 40 |
| Com. Ex. 1-1 | PVA(A1-9) | 800 | 250 | 50 | 100 | 192.1 | C | C | 28.3 | 105 |
| Com. Ex. 1-2 | PVA(A1-10) | 800 | 250 | 50 | 100 | 203.2 | C | C | 27.0 | 213 |
| Com. Ex. 1-3 | PVA(A1-11) | 800 | 250 | 50 | 100 | 234.4 | C | C | 27.0 | 349 |
| Com. Ex. 1-4 | PVA(A1-12) | 800 | 250 | 50 | 100 | 183.2 | B | C | 25.2 | 179 |
| Com. Ex. 1-5 | PVA(A1-13) | 800 | 250 | 50 | 100 | 378.2 | C | C | 22.3 | 972 |
| Com. Ex. 1-6 | PVA(A1-14) | 800 | 250 | 50 | 100 | 162.1 | B | B | 22.8 | 205 |
| Com. Ex. 1-7 | PVA(A1-15) | 800 | 250 | 50 | 100 | 156.7 | B | B | 21.4 | 776 |
| Com. Ex. 1-8 | PVA(A1-16) | 800 | 250 | 50 | 100 | 166.6 | B | B | 27.5 | 946 |

Example 2-1

PVA(A2-1) as a dispersion stabilizer for suspension polymerization was dissolved in deionized water, and 100 parts of the PVA(A2-1) aqueous solution was charged into an autoclave. Here, PVA(A2-1) was charged in an amount that makes the PVA(A2-1) concentration 760 ppm with respect to the amount of the vinyl chloride charged. Thereafter, deionized water was added to make the total fraction of deionized water 1,200 parts. This was followed by addition of 0.65 parts of a 70% toluene solution of cumyl peroxyneodecanoate, and 1.05 parts of a 70% toluene solution of t-butyl peroxyneodecanoate into an autoclave, and nitrogen was introduced into the autoclave until the pressure reached 0.2 MPa. Nitrogen purging was conducted a total of five times to thoroughly replace inside of the autoclave with nitrogen and remove oxygen. After this procedure, 940 parts of vinyl chloride was added. The contents inside the autoclave were then heated to 57° C. to initiate suspension polymerization of vinyl chloride, with stirring. The autoclave had an inner pressure of 0.80 MPa at the start of polymerization. After about 3.5 hours from the start of polymerization, the polymerization was ceased at the timing when the pressure inside the autoclave reached 0.70 MPa. The polymerization product was taken out after removing average particle diameter with a small proportion of coarse particles. The polymerization stability was also desirable, and the fisheye count was small.

Comparative Example 2-1

Suspension polymerization of vinyl chloride was conducted in the same manner as in Example 2-1, except that PVA(A2-10) was used as PVA(A). The evaluation results for the vinyl chloride polymer particles produced are presented in Table 6. PVA(A2-10) had an overly small absorbance value (x) at 280 nm in an ultraviolet absorption spectrum of a 0.1 mass % aqueous solution. Accordingly, the water-insoluble content was high, and the vinyl chloride polymer particles produced had a large average particle diameter with a large proportion of coarse particles. The polymerization stability was insufficient, and the fisheye count was high.

Comparative Example 2-2

Attempts were made to carry out suspension polymerization of vinyl chloride in the same manner as in Example 2-1 except for using PVA(A2-11) as PVA(A). However, because of an overly low degree of saponification, PVA(A2-11) was insoluble in water, and the attempts for suspension polymerization of vinyl chloride failed.

Comparative Example 2-3

Suspension polymerization of vinyl chloride was conducted in the same manner as in Example 2-1, except that PVA(A2-12) was used as PVA(A). The evaluation results for the vinyl chloride polymer particles produced are presented in Table 6. PVA(A2-12) had an overly high degree of saponification, and the vinyl chloride polymer particles produced had a large average particle diameter with a large proportion of coarse particles. The polymerization stability was insufficient, and the fisheye count was high.

Comparative Example 2-4

Suspension polymerization of vinyl chloride was conducted in the same manner as in Example 2-1, except that PVA(A2-13) was used as PVA(A). The evaluation results for the vinyl chloride polymer particles produced are presented in Table 6. PVA(A2-13) had an overly small absorbance value (x) at 280 nm in an ultraviolet absorption spectrum of a 0.1 mass % aqueous solution. Accordingly, the water-insoluble content was high, and the vinyl chloride polymer particles produced had a large average particle diameter with a large proportion of coarse particles. The polymerization stability was insufficient, and the fisheye count was high.

TABLE 6

| | PVA | Analysis values for PVA(A) | | | | | |
|---|---|---|---|---|---|---|---|
| | | Degree of polymerization | Degree of saponification (mol %) | Content of terminal propyl group (mol %) | modifying group in the side chain | | UV absorbance (x) at 280 nm | Water-insoluble content (ppm) |
| | | | | | Type | Content (mol %) | | |
| Example 2-1 | PVA(A2-1) | 740 | 72 | 0.0051 | Itaconyl group | 0.11 | 0.293 | 80 |
| Example 2-2 | PVA(A2-2) | 510 | 72 | 0.0060 | Itaconyl group | 0.11 | 0.372 | 40 |
| Example 2-3 | PVA(A2-3) | 870 | 72 | 0.0027 | Methacryloyl group | 0.14 | 0.358 | 120 |
| Example 2-4 | PVA(A2-4) | 750 | 72 | 0.0522 | Acryloyl group | 0.23 | 0.387 | 390 |
| Example 2-5 | PVA(A2-5) | 740 | 69 | 0.0051 | Itaconyl group | 0.11 | 0.285 | 150 |
| Example 2-6 | PVA(A2-6) | 740 | 75 | 0.0051 | Itaconyl group | 0.11 | 0.296 | 60 |
| Example 2-7 | PVA(A2-7) | 740 | 72 | 0.0051 | Methacrylloy group | 0.07 | 0.400 | 50 |
| Example 2-8 | PVA(A2-8) | 740 | 75 | — | Itaconyl group | 0.11 | 0.292 | 520 |
| Example 2-9 | PVA(A2-9) | 740 | 72 | 0.1400 | Itaconyl group | 0.11 | 0.256 | 40 |
| Com. Ex. 2-1 | PVA(A2-10) | 740 | 72 | — | Itaconyl group | 0.11 | 0.007 | 20000 |
| Com. Ex. 2-2 | PVA(A2-11) | 740 | 65 | 0.0051 | Itaconyl group | 0.11 | 0.284 | Not soluble |
| Com. Ex. 2-3 | PVA(A2-12) | 740 | 82 | 0.0051 | Itaconyl group | 0.11 | 0.302 | 70 |
| Com. Ex. 2-4 | PVA(A2-13) | 850 | 72 | 0.0010 | Itaconyl group | 0.11 | 0.139 | 8500 |

| | Evaluation results for vinyl chloride polymer particles | | | |
|---|---|---|---|---|
| | Average particle diameter (μm) | Particle size distribution | | Fisheye count |
| | | Particles on 42 mesh | Particles on 60 mesh | |
| Example 2-1 | 151.2 | A | A | 3 |
| Example 2-2 | 161.2 | A | A | 4 |
| Example 2-3 | 138.2 | A | A | 9 |
| Example 2-4 | 140.1 | A | A | 18 |
| Example 2-5 | 155.9 | A | A | 5 |
| Example 2-6 | 160.4 | A | A | 24 |
| Example 2-7 | 156.8 | A | A | 16 |
| Example 2-8 | 168.1 | B | A | 66 |
| Example 2-9 | 168.7 | B | A | 20 |
| Com. Ex. 2-1 | 190.1 | C | C | 2500 |
| Com. Ex. 2-2 | — | — | — | — |
| Com. Ex. 2-3 | 197.2 | C | C | 3200 |
| Com. Ex. 2-4 | 188.3 | C | B | 1800 |

As demonstrated in Examples, by using the dispersion stabilizer for suspension polymerization comprising the specific PVA(A) of the present invention, suspension polymerization of a vinyl compound can be carried out with improved polymerization stability, and the resulting vinyl polymer can have a small average particle diameter with reduced formation of coarse particles, improving workability with a reduced number of fisheyes. The vinyl polymer produced also excels in plasticizer absorptivity. The present invention is therefore highly useful in industry.

The invention claimed is:

1. A dispersion stabilizer for suspension polymerization of a vinyl compound, the dispersion stabilizer comprising a vinyl alcohol polymer (A) having a viscosity-average degree of polymerization of more than 400 and less than 1,000, a degree of saponification of more than 67 mol % and less than 78 mol %, 0.02 mol % to 1.0 mol % of a group having an ethylenic double bond, and an absorbance (x) at 280 nm of more than 0.17 and less than 0.65 in an ultraviolet absorption spectrum of a 0.1 mass % aqueous solution, wherein the group having an ethylenic double bond is an allyl ether group or a vinyl ether group.

2. The dispersion stabilizer for suspension polymerization according to claim 1, wherein the vinyl alcohol polymer (A) comprises a terminal with an aliphatic acyl group having 2 to 8 carbon atoms, or with a propyl group.

3. The dispersion stabilizer for suspension polymerization according to claim 2, wherein the aliphatic acyl group has 2 to 4 carbon atoms.

4. The dispersion stabilizer for suspension polymerization according to claim 2, wherein the aliphatic acyl group is an acetyl group.

5. A dispersion stabilizer for suspension polymerization of a vinyl compound, the dispersion stabilizer comprising a vinyl alcohol polymer (A) having a viscosity-average degree of polymerization of more than 400 and less than 1,000, a degree of saponification of more than 67 mol % and less than 78 mol %, 0.02 mol % to 1.0 mol % of a group having an ethylenic double bond, and an absorbance (x) at 280 nm of more than 0.17 and less than 0.65 in an ultraviolet absorption spectrum of a 0.1 mass% aqueous solution, wherein the vinyl alcohol polymer (A) comprises a terminal with 0.0005 mol % to 0.1 mol % of a propyl group.

6. The dispersion stabilizer for suspension polymerization according to claim 1, wherein the group having an ethylenic double bond is at least one selected from the group consisting of an itaconyl group, a methacryloyl group, and an acryloyl group.

7. A method for producing a vinyl polymer, comprising subjecting a vinyl compound to suspension polymerization in the presence of the dispersion stabilizer for suspension polymerization of claim 1.

8. The method for producing a vinyl polymer according to claim 7, wherein the vinyl compound is subjected to suspension polymerization in the presence of an additional vinyl alcohol polymer (B) having a viscosity-average degree of polymerization of less than 600, and a degree of saponification of more than 30 mol % and less than 60 mol %.

9. A method for producing a vinyl polymer, comprising subjecting a vinyl compound to suspension polymerization in the presence of the dispersion stabilizer for suspension polymerization of claim 5.

10. The method for producing a vinyl polymer according to claim 9, wherein the vinyl compound is subjected to suspension polymerization in the presence of an additional vinyl alcohol polymer (B) having a viscosity-average degree of polymerization of less than 600, and a degree of saponification of more than 30 mol % and less than 60 mol %.

* * * * *